US006289363B1

United States Patent
Consolatti et al.

(10) Patent No.: US 6,289,363 B1
(45) Date of Patent: Sep. 11, 2001

(54) NAVIGATION EDITOR FRAMEWORK FOR BUILDING MULITMEDIA TITLES

(75) Inventors: Scott Michael Consolatti, Raleigh; Randy Peter Eckhoff, Apex; Dennis Donald King, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/702,818

(22) Filed: Aug. 23, 1996

(51) Int. Cl.[7] ............................................. G06F 15/00
(52) U.S. Cl. ................................... 707/515; 707/501
(58) Field of Search ................................ 707/515, 530, 707/516, 526, 103, 518, 501, 500, 515.518, 526.53; 345/302, 433, 335

(56) References Cited

U.S. PATENT DOCUMENTS

| | | | |
|---|---|---|---|
| 5,388,264 | * 2/1995 | Tobias, II et al. | 395/650 |
| 5,564,001 | * 10/1996 | Lewis | 395/154 |
| 5,612,730 | * 3/1997 | Lewis | 348/8 |
| 5,748,186 | * 5/1998 | Raman | 345/302 |
| 5,767,846 | * 10/1998 | Nakamura et al. | 345/302 |
| 5,795,228 | * 8/1998 | Trumbull et al. | 463/42 |
| 5,818,435 | * 10/1998 | Kozuka et al. | 345/302 |
| 5,848,291 | * 12/1998 | Milne et al. | 395/806 |

* cited by examiner

*Primary Examiner*—Hosain T. Alam
*Assistant Examiner*—Alford W. Kindred
(74) *Attorney, Agent, or Firm*—Gregory M. Doudnikoff

(57) ABSTRACT

A technique for permitting the creation of multimedia titles in the form of flip books or stories comprising individual scenes includes simplified techniques for establishing navigation both internal and external navigation. The present invention provides a part or framework usable in a power tool environment which enables individual scenes within a multimedia story being created to be linked directly to parts or applications external to the multimedia story such that processing can jump directly from a scene to an external application or part. Additionally, the present invention provides improved navigation between scenes within a multimedia story and the ability to embed stories within individual scenes of the story.

7 Claims, 14 Drawing Sheets

NAVIGATION EDITOR FRAMEWORK FOR BUILDING MULITMEDIA TITLES

BACKGROUND OF THE INVENTION

1. Field of the Invention

The present invention relates to improvements in creating multimedia titles. More particularly, the present invention relates to a system, method and computer implemented process for use with application development software which permits rapid construction of multimedia titles.

2. Description of the Related Art

One of the fastest growing areas for computer technology is known as multimedia. A multimedia software application, usually referred to as a multimedia title, is an application that (by one popular definition) combines at least two elements from a list including video, audio, text, graphics and animation, which can be displayed on a display device and with which an end user can interact. Given the material or content now available for use in multimedia titles, such as film or animation clips, music, etc., multimedia titles make using computers simpler and more interesting and are effective mechanisms for conveying information. The use of multimedia titles is expanding rapidly, especially in public or semi-public situations, since multimedia titles can be developed such that little computer expertise is required of an end user. The techniques employed in multimedia titles are also gaining popularity for use in kiosks or direct customer access machines (such as automatic teller machines), in computer-based training, and educational and game titles.

One of the most popular types of multimedia titles is known as the flipbook. A flipbook is a story which comprises a number of scenes in which the content is included, which are analogous to pages in a book. Typically, a complete set of scenes constitutes the entire multimedia title. Each scene typically presents a different piece of the multimedia title with which an end user can interact. Each scene may include content such as text, graphics, animation, video clips, music, etc., and/or one or more "hot spots" through which the end user may interact with the scene. The title may be created such that from a given scene, the end user can proceed to other scenes in the story by utilizing "hot spot" based navigation included in the scene by its developer. Which scenes an end user can navigate to depends entirely on the developer. By selecting or clicking an appropriately programmed hot spot, the title moves to a corresponding scene. The end user may be able to navigate from one scene to one, two, three or more different scenes via different hot spots. Alternatively, the termination of a period of time can cause the title to automatically move from the scene to a predetermined scene. However, each scene is typically part of a sequence of scenes which are navigated linearly, and the end user is required to navigate the scenes linearly one at a time, like going through a flipbook one page at a time.

A number of application development tools for creating multimedia titles, also known as multimedia authoring tools, exist today. However, these tools have a number of drawbacks. One existing tool is Multimedia Toolbook from Asymetrix Corporation. The Multimedia Toolbook product permits a developer to create multimedia titles in the form of flipbooks, with each finished flipbook being the entire application itself. The resulting title is difficult to integrate with other software applications, in that it stands alone and must be loaded by itself onto the computer hardware and operating software from which it will interact with an end user. Thus, if a multimedia title created with Multimedia Toolbook is to be used in conjunction with other applications in, for example, a kiosk environment, a software integrator would have the difficult task of coordinating calls back and forth between the multimedia title and the other software applications to make them work in a coordinated fashion.

Additionally, within the Multimedia Toolbook development environment, it remains a difficult chore for a developer to connect the individual pages or scenes in the flipbook/multimedia title being created to each other. That is, each page or scene must be created from scratch, and the code for connecting one scene with the next scene (or scenes) must be manually written relative to each page or scene. This consumes extensive amounts of developer time and is quite cumbersome. Additionally, other limitations exist. It is very difficult to connect components of individual scenes with other applications or specific components of other applications which run concurrently on the same computer hardware/software environment. Additionally, an end user is typically running either the flipbook or story or a different application in the computing environment. It is difficult to program the flipbooks and applications to jump back and forth and maintain prior frames of reference or positions within the flipbooks and applications.

Other limitations of prior art flipbooks development tools include the fact that resulting flipbooks are typically linear, with the ability to branch or fork. That is, an end user either travels down one path of scenes or another. And while an individual scene may have some ability to have an end user interact with it, prior art flipbook multimedia authoring tools do not permit a substory to be created within a scene which has its own set of scenes independent from the rest of the flipbook.

Accordingly, a need exists for an improved technique for creating multimedia titles which simplifies the development process and provides greater flexibility and function.

SUMMARY OF THE INVENTION

An object of the present invention is to provide a system and method for enabling rapid development of scenes for a multimedia title.

Another object is to provide a system and method which permits a developer to easily and intuitively connect scenes within a multimedia title.

Yet another object of the present invention is to enable developers to create flipbooks which are part of larger software applications.

A still further object of the present invention is to provide a system and method for permitting a developer to create multimedia titles having stories within individual scenes of the multimedia title.

Other objects and advantages of the present invention will be set forth in part in the description and the drawings which follow, and, in part, will be obvious from the description, or may be learned by practice of the invention.

To achieve the forgoing objects, and in accordance with the purpose of the invention as broadly described herein, the present invention provides, in a computing environment, a software component for creating a multimedia story having a plurality of individual scenes included therein, the software component comprising first subprocesses for logically connecting a first scene to a software element external to the multimedia story for causing processing to jump from the first scene to the external software element upon occurrence of an event relative to the first scene; and second subprocesses for automatically linking an event in a second scene to a third scene in the multimedia story such that occurrence of the event causes processing to jump from the second scene to the third scene during execution of the multimedia story. The software component may further comprise third subprocesses for permitting a second story to be embedded within one of the scenes of the multimedia story. Preferably, the software component is an object oriented part.

Alternatively, the present invention provides a system for permitting simplified navigation from scenes in a multimedia story which comprises a plurality of scenes, comprising means for associating an event within a first scene with a software component external to the multimedia story so that upon occurrence of the event during execution of the multimedia story, processing jumps from the first scene to the external software component; and means for automatically connecting a second event within a second scene to a third scene within the multimedia story so that upon occurrence of the second event associated with the second scene during execution of the multimedia story processing jumps to the third scene. The system may further comprise means for permitting a new multimedia story to be embedded within one of the scenes of the multimedia story. Further, the multimedia story and the external software component are preferably both parts which are included in an application created with a power tool.

The present invention will now be described with reference to the following drawings, in which like reference numbers denote the same element throughout.

DESCRIPTION OF THE PREFERRED EMBODIMENT

Figure 1:
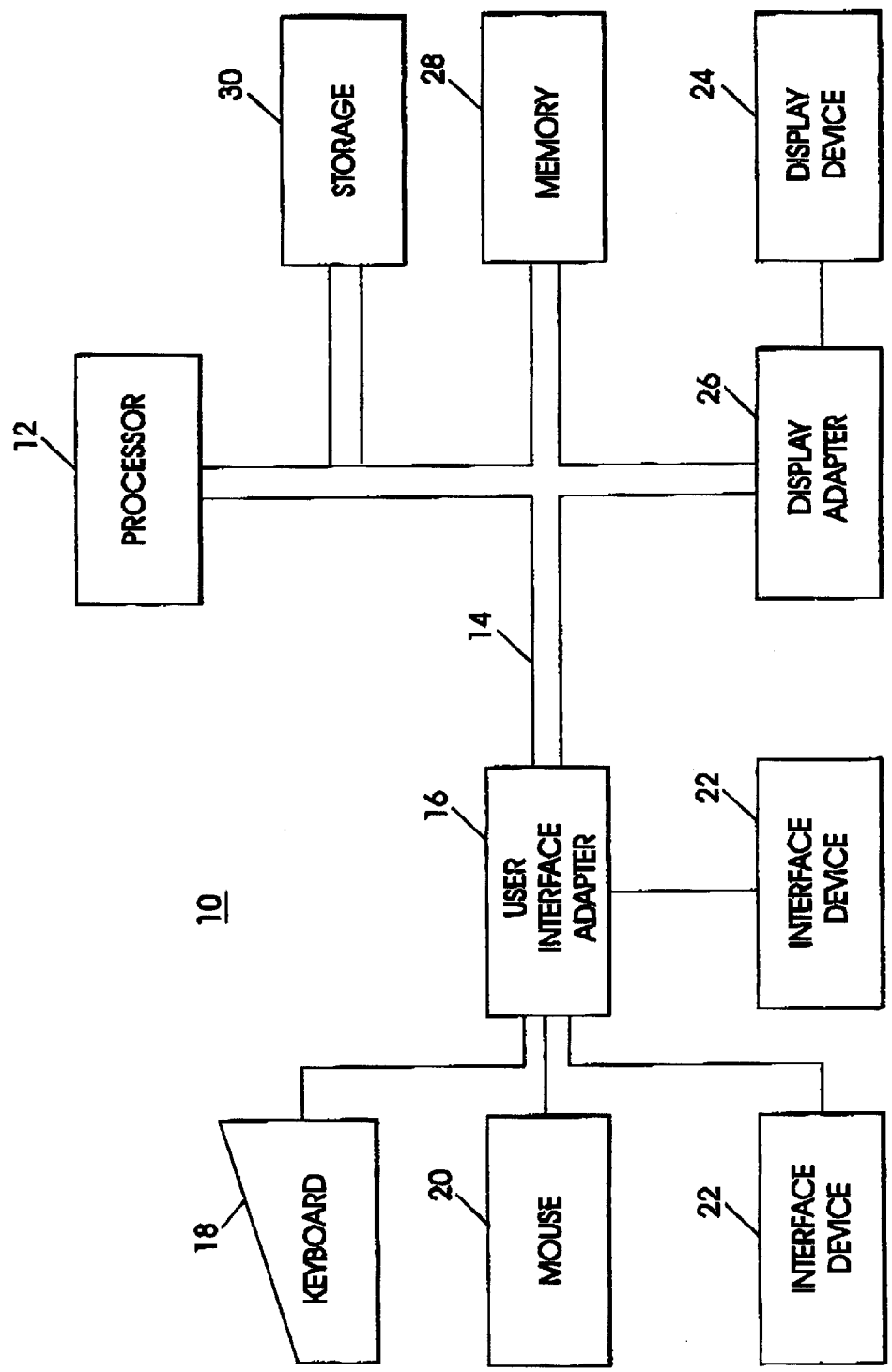
FIG. 1 is a block diagram of a representative hardware environment in which the present invention may be practiced.

The present invention may be performed in any of a variety of computer hardware environments and operating systems and/or software platforms combinations utilizing an object oriented language. FIG. 1 illustrates a representative hardware environment in which the present invention may be practiced. The environment of FIG. 1 is representative of a conventional single user computer workstation 10, such as a personal computer, and related peripheral devices. The hardware of FIG. 1 can also be employed within a kiosk which executes multimedia titles created in accordance with the present invention in public or semi-public environments. The workstation 10 includes a microprocessor 12 and bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface devices, such as a touch sensitive screen, digitized pen entry pad, etc. The bus 14 also connects a display device 24, such as an LCD screen or monitor, to the microprocessor 12 via a display adapter 26. The bus 14 also connects the microprocessor 12 to memory 28, such as RAM, and a storage device 30, such as a hard disk.

Software program code which employs the present invention is typically stored in the hard disk 30 of the workstation 10, from which a developer may access the code for execution of the program. For distribution purposes, the software program code may be embodied on any of a variety of known media for use with a data processing system, such as a diskette or CD-ROM, or may be distributed to users from the storage of one computer system over a network of some type to other computer systems for use by users of such other systems. The techniques and methods for embodying software program code on physical media and/or distributing software code via networks are well known and will not be further discussed herein.

The present invention is described below in its preferred embodiment, in which the present invention is implemented in a Smalltalk language software program operating on an OS/2 operating system environment in a hardware environment such as described above with respect to FIG. 1. OS/2 is a registered trademark of the International Business Machines Corporation (IBM). Smalltalk is an object oriented language, and classes or parts or objects written in Smalltalk may be readily reused extensively (if properly written). In object oriented languages, such as Smalltalk and Java, classes are software entities comprising data structures (i.e., state information) and functions/operations on data (i.e., behavior). Java is a trademark of Sun Microsystems, Inc. Thus, classes are able to model real world entities in terms of characteristics (represented by data elements) and behavior (represented by data elements) and behavior (represented by data manipulation functions). Object oriented programing has inherently therein a number of basic characteristics which are not found in procedural programming languages, such as C and COBOL, including polymorphism and inheritance. Data and algorithms are incorporated in the internal structure of classes. Through polymorphism, an object oriented software component (such as an object, which is an instance of a class employed in an application) may make a request of another component or object during execution without knowing exactly what that object or component is. The object or component which receives the request interprets the request in accordance with its internal data and functions, how to execute the request. The concept of inheritance permits ease in modification of a class. A developer can write a subclass which inherits behavior from all its parent classes. The developer, by customizing the subclass, can effectively customize the entire hierarchy of classes to meet the developer's own needs. Thus the bulk of object oriented software elements may be reused without requiring extensive new coding, recoding or modifications.

All of these properties of object oriented programming, as well as related oriented object programming techniques, are well known to those skilled in the art, and will not be discussed in depth herein. From the description recited herein, a skilled programmer could implement the present invention. While the present invention will be described in terms of a part or framework designed for a Smalltalk power tool such as VisualAge for Smalltalk from IBM, the present invention may be embodied by a skilled programmer as an OpenDoc part, an ActiveX component, a C++ or Java class library, a Visual Basic control, etc. VisualAge is a trademark of IBM; Visual Basic is a registered trademark of Microsoft Corporation.

Power tools are the most recent wave of application development tools, and include PowerBuilder from Power-Soft Corporation. These tools are especially useful for the novice developer relative to the creation of graphical user interfaces (GUIs) for software applications. For basic GUIs, such tools eliminate the need for a developer to write code. Instead, the developer creates a GUI by dragging and dropping iconic representations of pre-written components or constructs or parts from a palette or the like, and logically connects the components with other elements of the GUI or underlying software application. Such components may be used any number of times. However, such tools have not been optimized to develop multimedia tools, and the underlying languages for some of these tools, such as PowerBuilder, are procedural languages. Components of code written in procedural languages are relatively difficult to develop for reuse and can be difficult to integrate into a program being developed. This problem increases as the size of the components increases. Accordingly, most such pre-written components for procedural language-based power tools are relatively simple in nature, and, for the most part, complex GUI elements or domain specific logic still must be written by hand, line by line, or pieced together from relatively simple available components.

Even more recently, power tools which utilize object oriented languages have been developed, such as Visual C++ from Microsoft Corporation and VisualAge for Smalltalk. However, these tools have lacked the ability to permit developers to build robust multimedia applications quickly, as the complex components necessary to permit such development have been unavailable.

According to the preferred embodiment, a navigation editor framework or part is provided with or for use with a Smalltalk application development power tool, such as VisualAge for Smalltalk. In such an object oriented power tool environment, a part may be provided with a product by the product vendor or may be provided separately by the product vendor or third party vendor for use with the product. In either case, parts to be used in connection with creating a software application with the power tool are typically tied into the power tool's development environment such that the part may be invoked by manipulation of an iconic representation of the part on the power tool's parts palette.

Figure 2A:
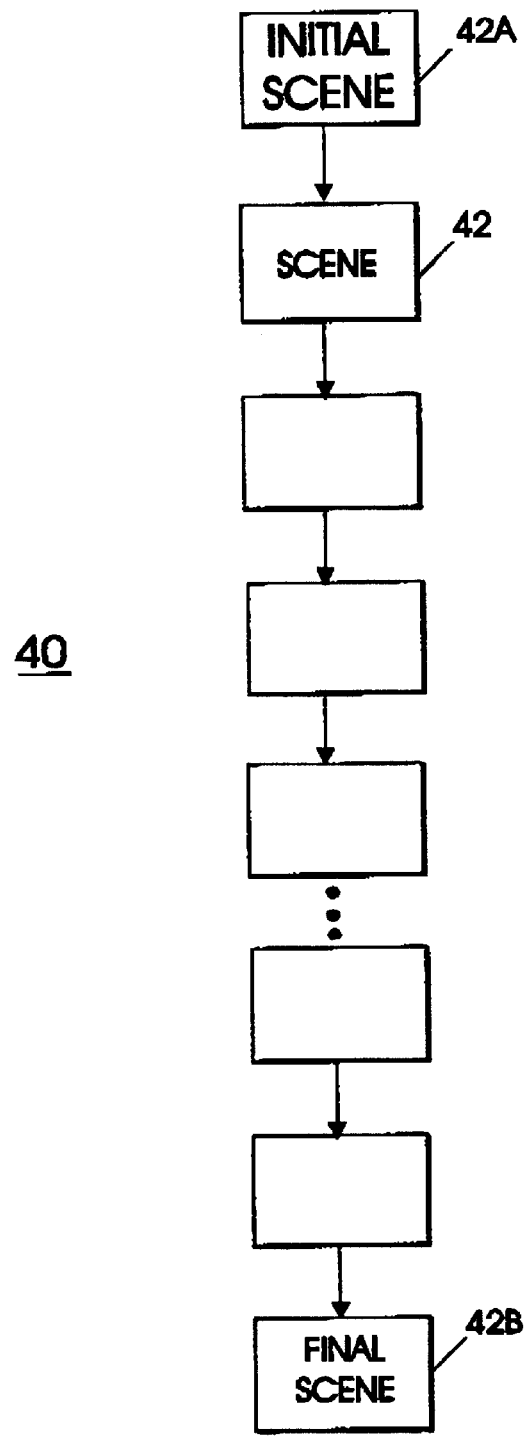
FIGS. 2A–B illustrate relationships between individual scenes within prior art flipbook style multimedia titles.
Figure 2B:
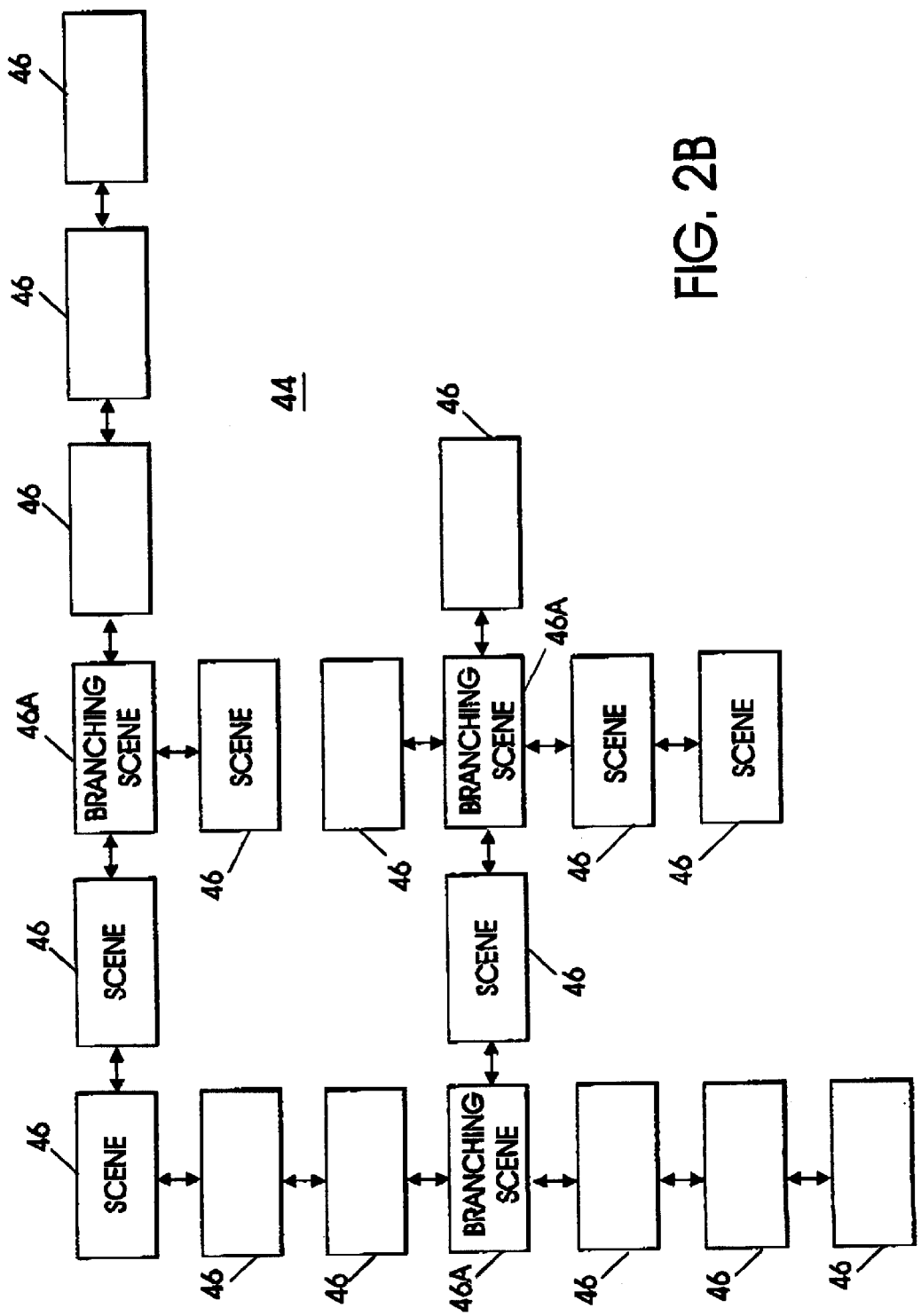

FIGS. 2A and 2B illustrate examples of stories which can be created using prior art flipbook authoring tools. In FIG. 2A, the simplest kind of story 40 is illustrated. The story 40 includes individual scenes 42 which may be navigated sequentially beginning with an initial scene 42a and ending with a final scene 42b. The story 40 of FIG. 2A represents the entire application.

Similarly, a story 44 of FIG. 2B presents a number of scenes 46. The story 44 has some additional navigation options provided therein. For example, as indicated by the arrows, an end user may navigate in either direction, such as by appropriately manipulating hot spots included in an individual scene 46. Further, at branching scenes 46a, the end user is provided with options for navigating to at least two different paths of scenes 46. Once again, the end user proceeds down one of the available paths of scenes 46 from a branching scene 46a by selecting an associated hot spot within the scene 46a. Once again, the story 44 represents an entire application.

Figure 3:
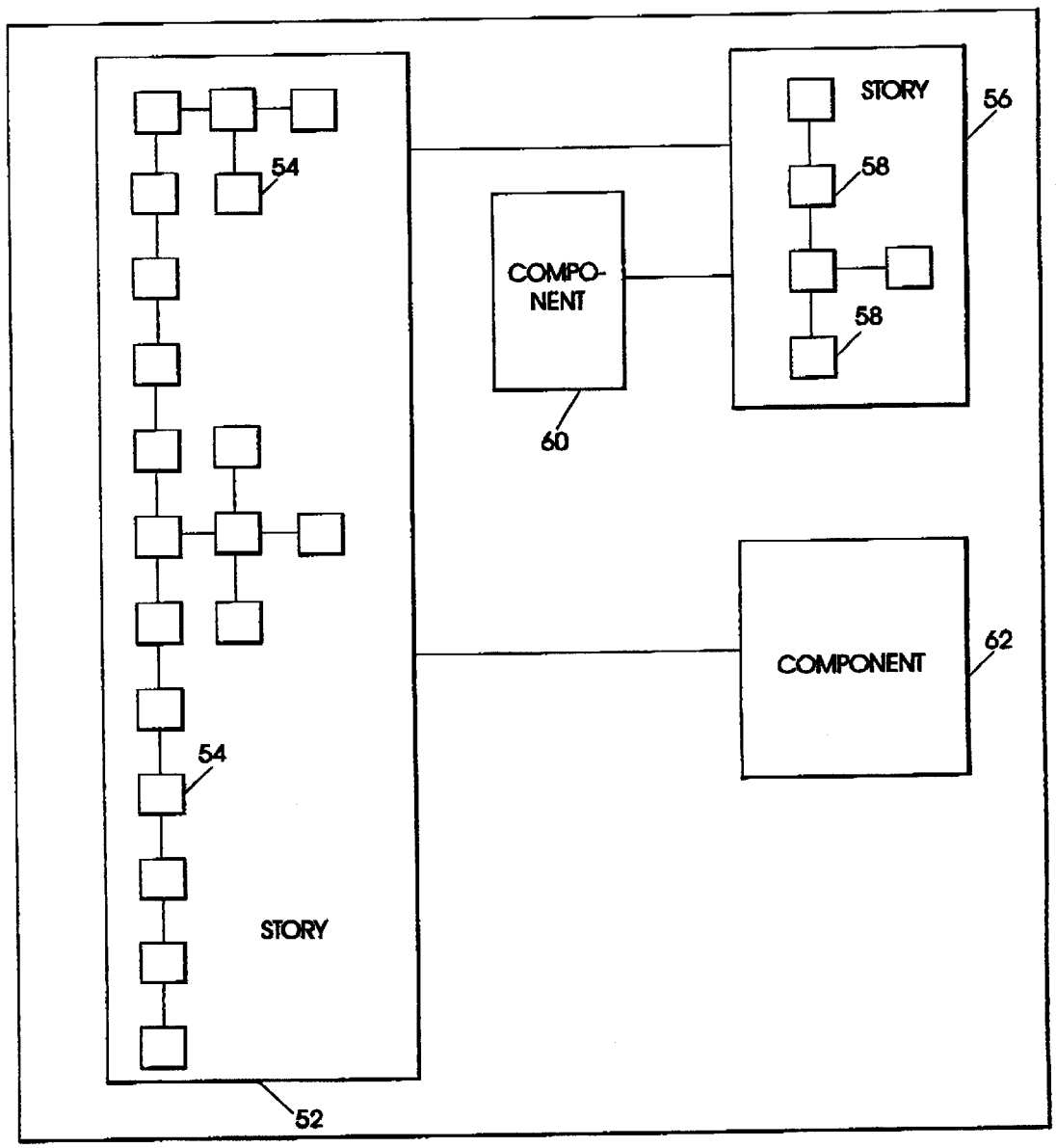
FIG. 3 is a graphical representation of a flipbook style multimedia title created within a larger application in accordance with the present invention.

FIG. 3 schematically illustrates an application which may be created utilizing the present invention. An overall application 50 comprises a number of components, including a first story 52 including multiple scenes 54, a second story 56 comprising multiple scenes 58, and components 60, 62. Connections interfaces provided in the part which creates stories in accordance with the present invention enables the stories 52, 56 to be connected to each other and to the components 60, 62. Thus, by selecting an option associated with one of the scenes 54 of the story 52 provided by the part, an end user may run the story 52, and cause execution of the story 52 to be interrupted or ended, depending on the programming, and jump to the second story 56 or the second component 62. The components 60, 62 can be any logic components which may be created. The components 60, 62 can be independent instances of parts or applications created using the power tool. For example, the first story 52 may present travel information to the end user for a particular travel destination. One of the scenes 54 may be manipulated such that selection of a particular hot spot automatically causes the application 50 to jump to the component 62, which may be an application for accepting reservation requests, or for calculating the cost of travel to a desired destination presented in the story 52, or for initiating and enabling a direct communication line (over the Internet, for example) for speaking directly with a travel agent by audio or a combination of audio and video.

This overall architecture also permits elements to be added to the application 50 after the application 50 has been placed in use. For example, the second story 56 can provide travel information for a destination which was not originally available when the story 52 was created thus, by selecting an appropriate hot spot in one of the scenes 54 of the first story 52, the second story 56 can be run and provide the user with the new travel information.

Figure 4:
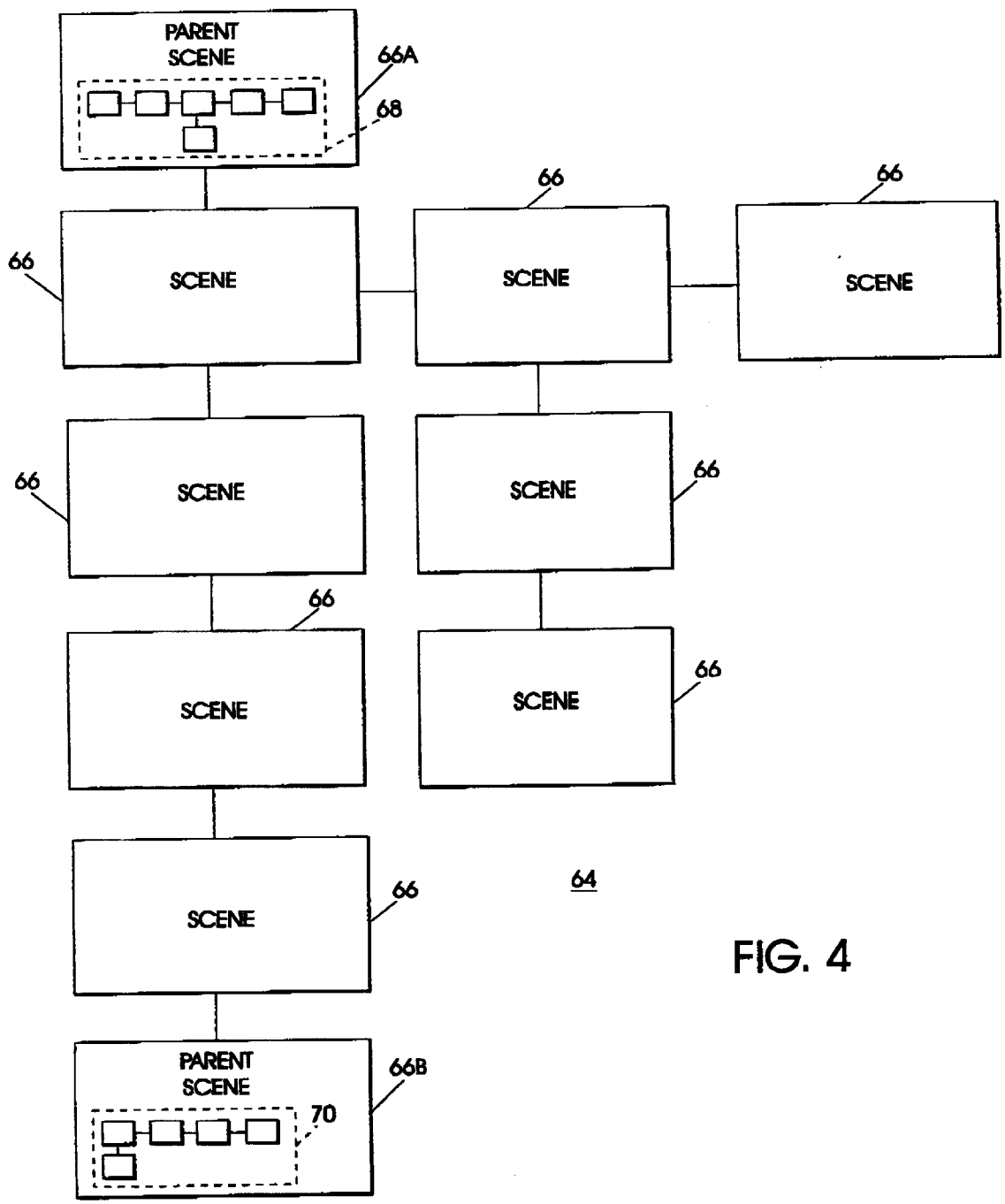
FIG. 4 illustrates a flipbook style multimedia title which includes stories embedded within scenes in accordance with the present invention.

FIG. 4 illustrates a story 64 which is possible to create utilizing the framework provided by the present invention. The story 64 includes a number of scenes 66. The present invention provides a technique for permitting stories to be embedded in scenes. The story 64 includes a pair of parent scenes 66a, 66b which include embedded stories 68, 70. The story 64 is the parent story for the stories 68, 70. Providing a developer with the ability to embed a story within a scene gives the developer added flexibility. This permits the developer to potentially add or delete or modify substories from an application or story already in use as necessary without having to rewrite the entire application or story. Further, the ability to create substories enables developers to control the navigation more completely, as a substory will usually only be accessed from the scene in which it is embedded, and the end users will typically only navigate from the substory back into its parent scene. The use of substories reduces complexity of the overall story and gives developers greater flexibility in creating and modifying stories.

The technique for creating such applications and stories as schematically illustrated in FIGS. 3 and 4 will now be described with reference to the flowcharts of FIGS. 5A–5C and 11 and the graphical user interface screen captures illustrated in FIGS. 6–10.

According to the preferred embodiment, a story navigation editor part or framework is provided with or for use with a Smalltalk application development power tool such as VisualAge for Smalltalk. Parts for power tools are created in accordance with prescribed architectures and interfaces. Writing a part to these standards permits a part to have an iconic selectable representation displayed in a parts palette and permits the parts to be related to and interact with other parts or components in an application being created.

Figure 6:
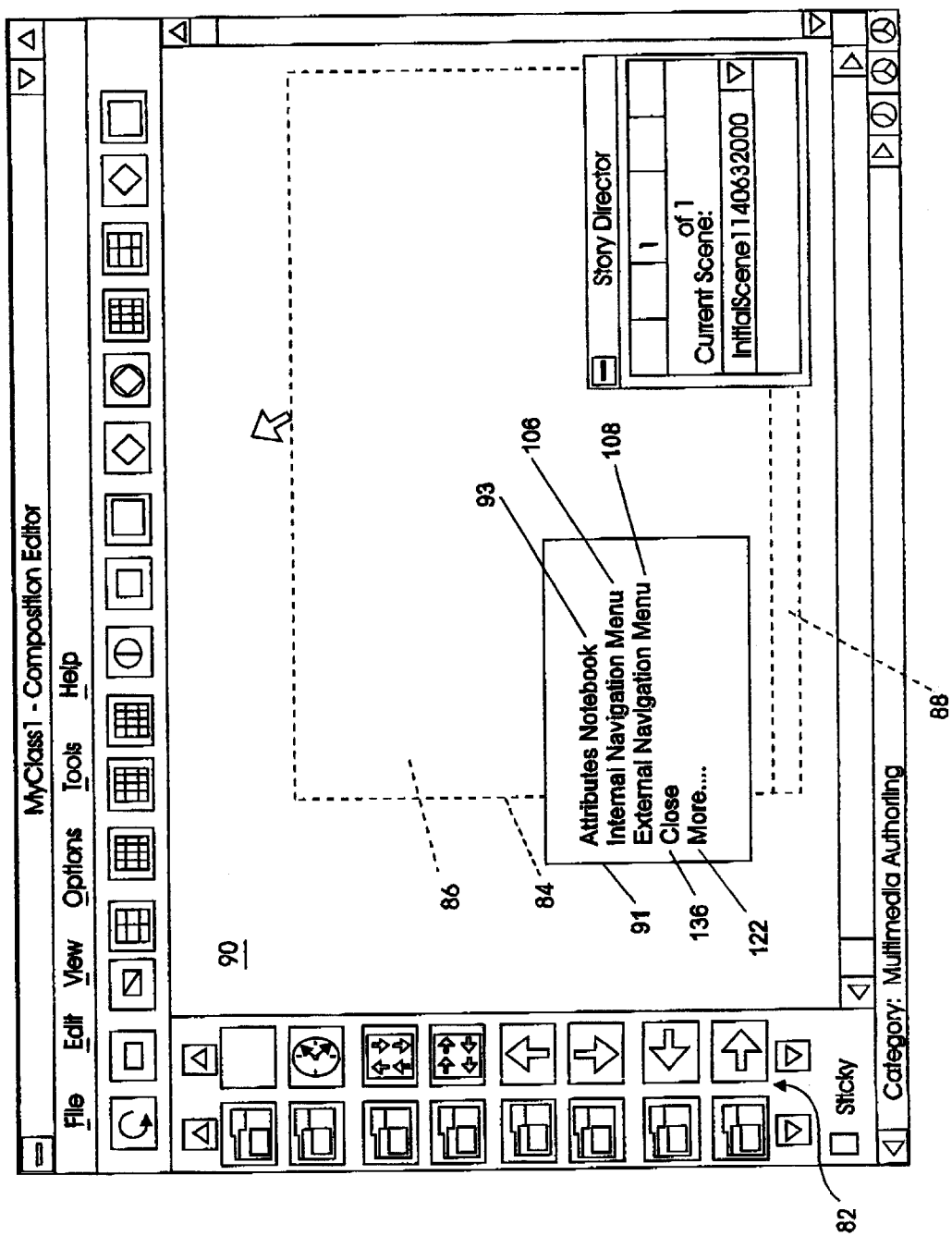
FIG. 6 illustrates a graphical user interface from a power tool in which a story part according to the present invention has been selected for processing.

An application building screen or composition editor 80 of a power tool in an application creation mode as displayed on the displayed device 24 is illustrated in FIG. 6. A user of the power tool (a developer) may invoke a part/add an instance of a part to an application being created by selecting the iconic representation of a part from a parts palette 82. The parts palette 82 may have a number of parts graphically represented therein, all of which are available for selection by the developer for use in the software application being developed. Upon selection by the developer of the story navigation part from the parts palette 82 (Step 100), a graphical story/scene representation 84 for the story navigation part having an empty scene portion 86 and a story access portion 88 is placed by the power tool in a work area or window 90 of the composition editor 80 (Step 104). Other components added to the work area 90 will typically be part of the same overall application. Additional processing may also be invoked relative to an instance of a story navigation part which has already been added to a software application being created. In this later situation, a developer may reopen a story navigation part previously saved by selecting or opening the saved part from within the work area 90 of the composition editor 80 (Step 102). A default scene from the saved story, such as the first scene from the saved story, is then displayed in the scene portion 86 (Step 104).

Following the creation of a new instance of the story part in Step 100 or the opening of a previously saved story part in Step 102, the developer has a number of options relative to the development of a story. The developer chooses a development option typically by utilization of a mouse and its buttons, such as to bring up an options menu and choose an option provided therein. For example, a scene options menu 91 provides options relative to the scene displayed in the scene portion 86. One option common to both the story and a scene involves setting or modifying any of a number of available settings or attributes with respect to the story as a whole or one of the scenes. As per Step 106, if a developer selects an "attributes notebook" option 93 from the menu 91, an appropriate settings notebook is displayed within the work area 90 (Step 108). The developer selects a settings notebook for an individual scene by placing the mouse cursor over the scene (when the scene is displayed within the portion 86) and, for example, double clicking the right mouse button to cause the scene options menu to be displayed, and then selecting the notebook option 93. The developer selects the settings notebook for the story as a whole by placing the mouse cursor over the story access portion 88 of the story/scene representation 84 and double clicking the right mouse button to cause a story options menu to be displayed and then selecting a notebook option.

When one of these events is determined to have occurred in Step 106, a settings notebook for the scene or the story, as appropriate, is displayed (Step 108). The developer may then select one of the attributes pages within the settings notebook (Step 110), and then the selected attributes page is displayed (Step 112).

The options menus provide the developer with a number of additional options, such as options for internal and external navigation, closing the part, etc. These options are described later.

Figure 7:
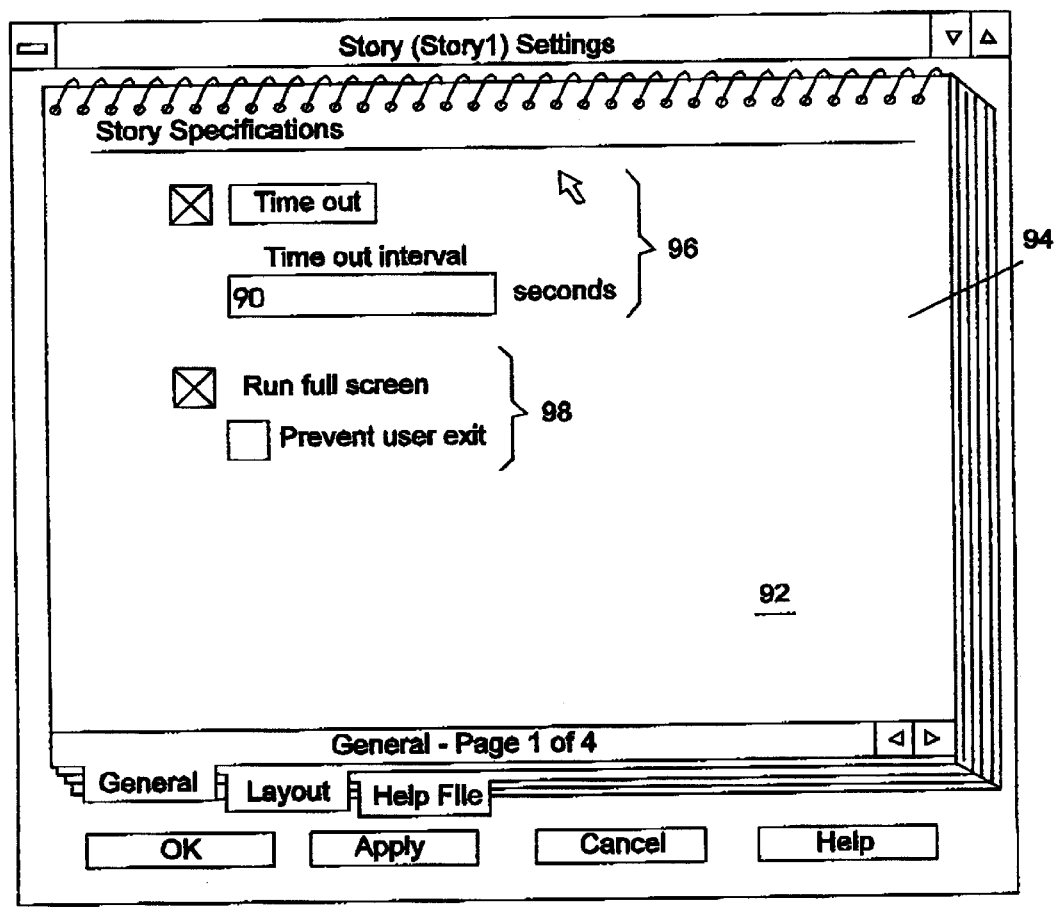
FIG. 7 illustrates an attributes notebook for setting attributes for the story part.

FIG. 7 illustrates an attributes notebook 92 for a story as a whole for which an attributes page 94 has been selected and displayed the attributes page 94 provides settings for a "time out" option 96 and a "full screen" option 98.

As discussed above, the developer can summon a settings notebook for display for a story or for an individual scene within the story. When the developer sets or changes a setting or attribute relative to the entire story via a page in the story settings notebook 92, that attribute is the same for each scene in the story. Examples of attributes which may be set relative to the entire story are the time interval after the story will return to the first scene in the story or a next sequential scene if no end user interaction occurs, and the relative size of the scenes within the display device which displays the application, i.e., whether or not the scene takes up the full screen or only a portion thereof.

Additionally, if the developer sets or changes a setting relative to the settings notebook for a given scene, only that scene will reflect or include the new setting. For example, the developer may set a specific "timeout" period or interval relative to the scene, or select a "rename scene" page from the attributes notebook for the scene and give the scene a desired name. This may be especially useful, since when a developer adds a scene to a story, the added scene is automatically provided with a default name, which is usually difficult to remember. By giving the scene a desired name, which is associated with some property of the scene and thus easier to remember, it may become easier to set navigation during development of the story. As will be discussed below, a developer may create connections between scenes which are not created sequentially. In accordance with the present invention, a developer may identify by name the desired scene to which the developer wants the story to proceed from a first scene upon occurrence of an event, such as selection of a hot spot. Other attributes which the developer may set via an attributes page include the size of the window which displays the scene within the display device. On any given attributes page, settings relative to one or more attributes may be set. Typically, a default setting is provided which the developer may change. Certain predefined, selectable settings may be provided within the attributes page as alternatives to the default setting, or the developer may enter a custom setting, such as a name for a scene.

Use of a settings notebook having a number of options contained in its selectable pages is a well-known paradigm, especially for application development tools which run on the OS/2 operating system. The settings notebook provides a convenient mechanism for the developer to set specific settings for certain attributes, events and actions which the programmer of the application development tool or the part has made available to the developer of the application being created. Specifics regarding the creation and use of an object oriented part which employs the notebook paradigm and the internal architecture of such a part are well-known and will not be described in detail. However, for every displayed page, such as the settings page 94 of the settings notebook 92 in FIG. 7, a developer may modify the settings. If it is determined that the developer has modified the settings (Step 114) and has opted to save the new settings (Step 116), the new settings are saved and the page 94 is closed (Step 118). Processing then returns to Step 108 with the settings notebook 92 being displayed. If the developer does not choose to change any settings in Step 114 or chooses not to save changes to the settings in Step 116, the developer may then select an option which closes the page 94 (Step 120). At such time, processing returns to Step 108, and the developer may further work with the settings notebook 92 in accordance with Steps 108–120. Alternatively, the developer may choose not to select an attributes page in Step 110, but may select an option which closes the settings notebook (Step 122). The settings notebook 92 is then closed (Step 124), and processing returns to Step 106. The option to close the notebook 92 may be provided to a developer at any point during the processing of the notebook 92 (Steps 108–120).

Figure 8:
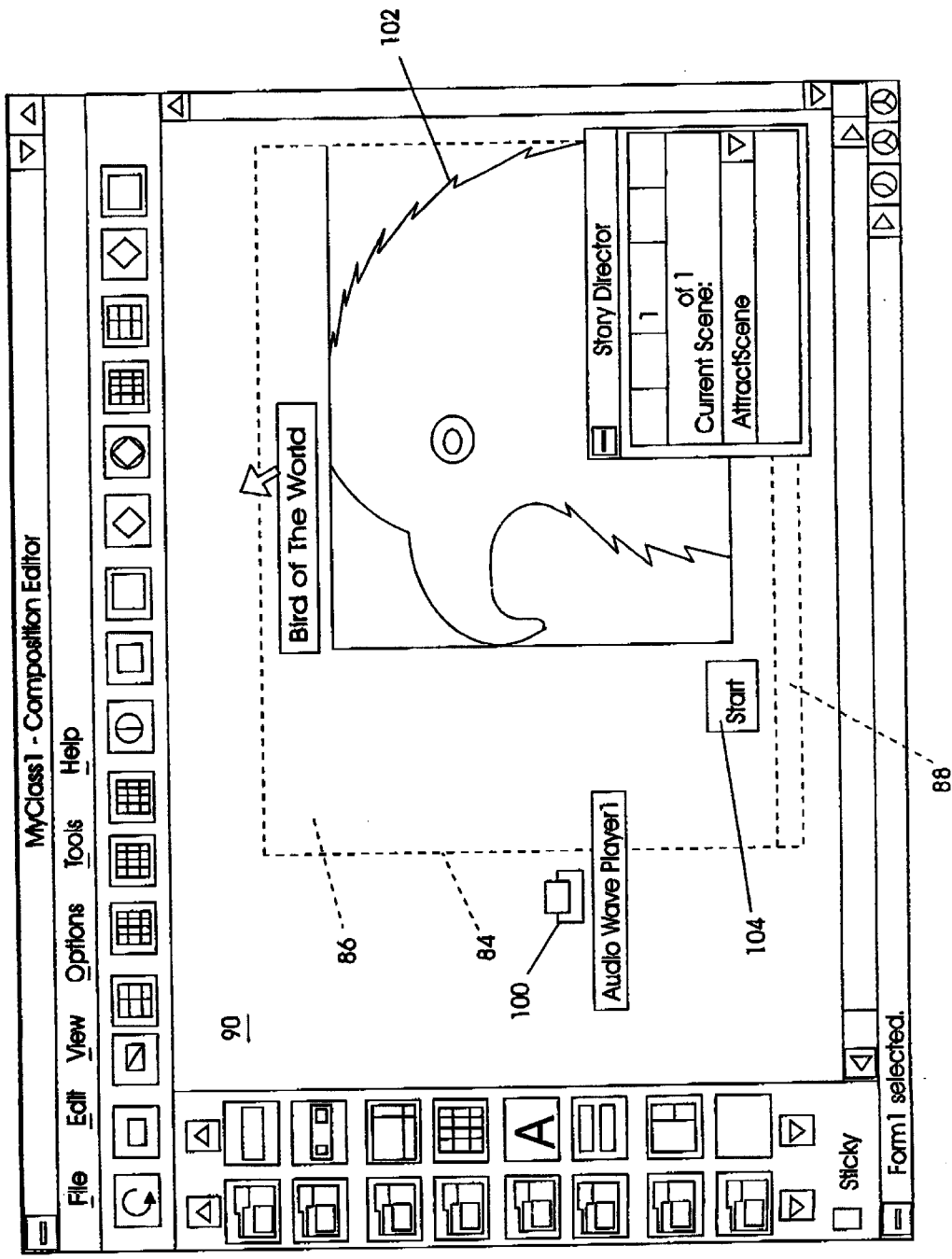
FIG. 8 illustrates a scene having content added thereto in a story being developed within the work area of a power tool.
Figure 9:
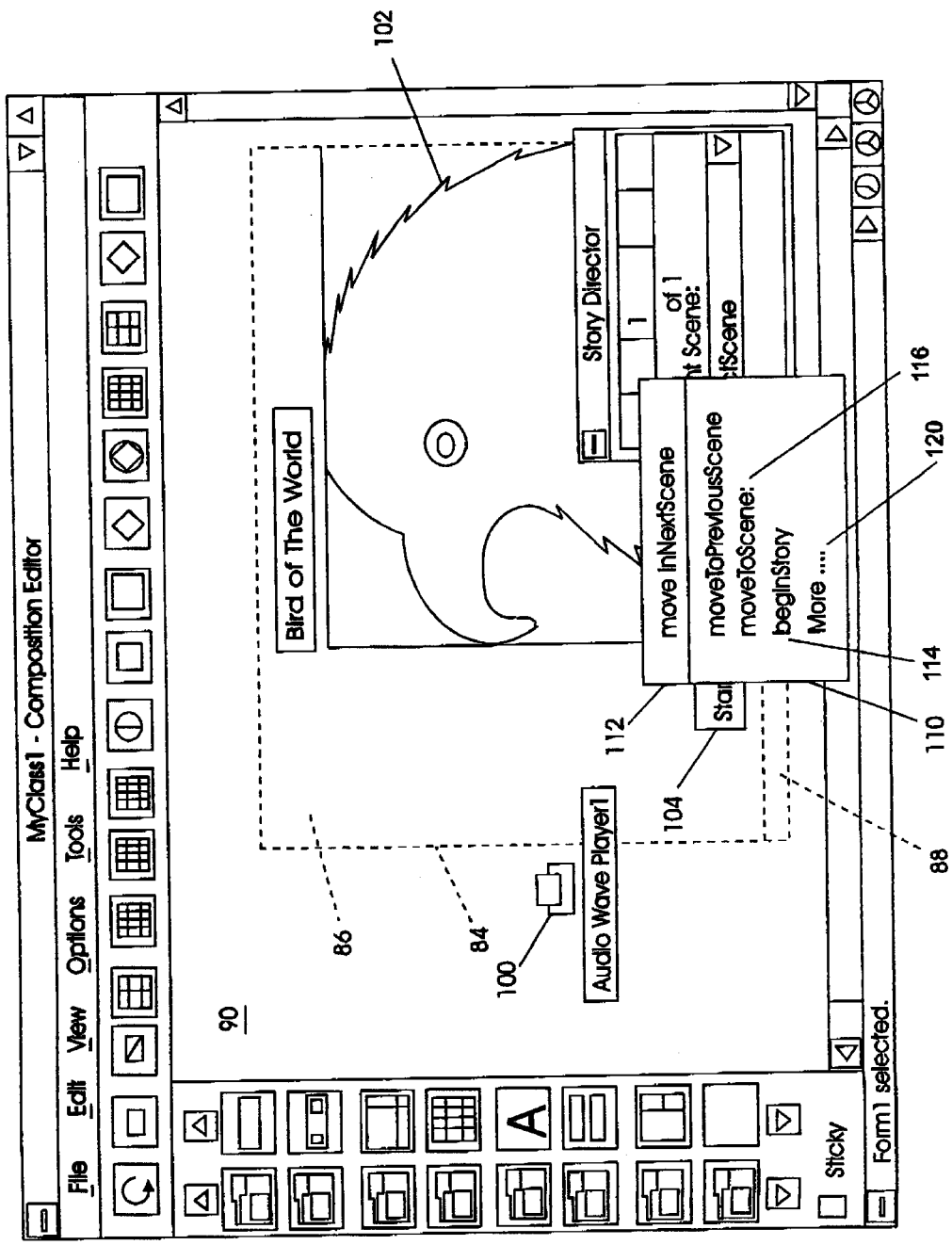
FIG. 9 illustrates the scene of FIG. 8 having an internal navigation menu displayed.
Figure 10:
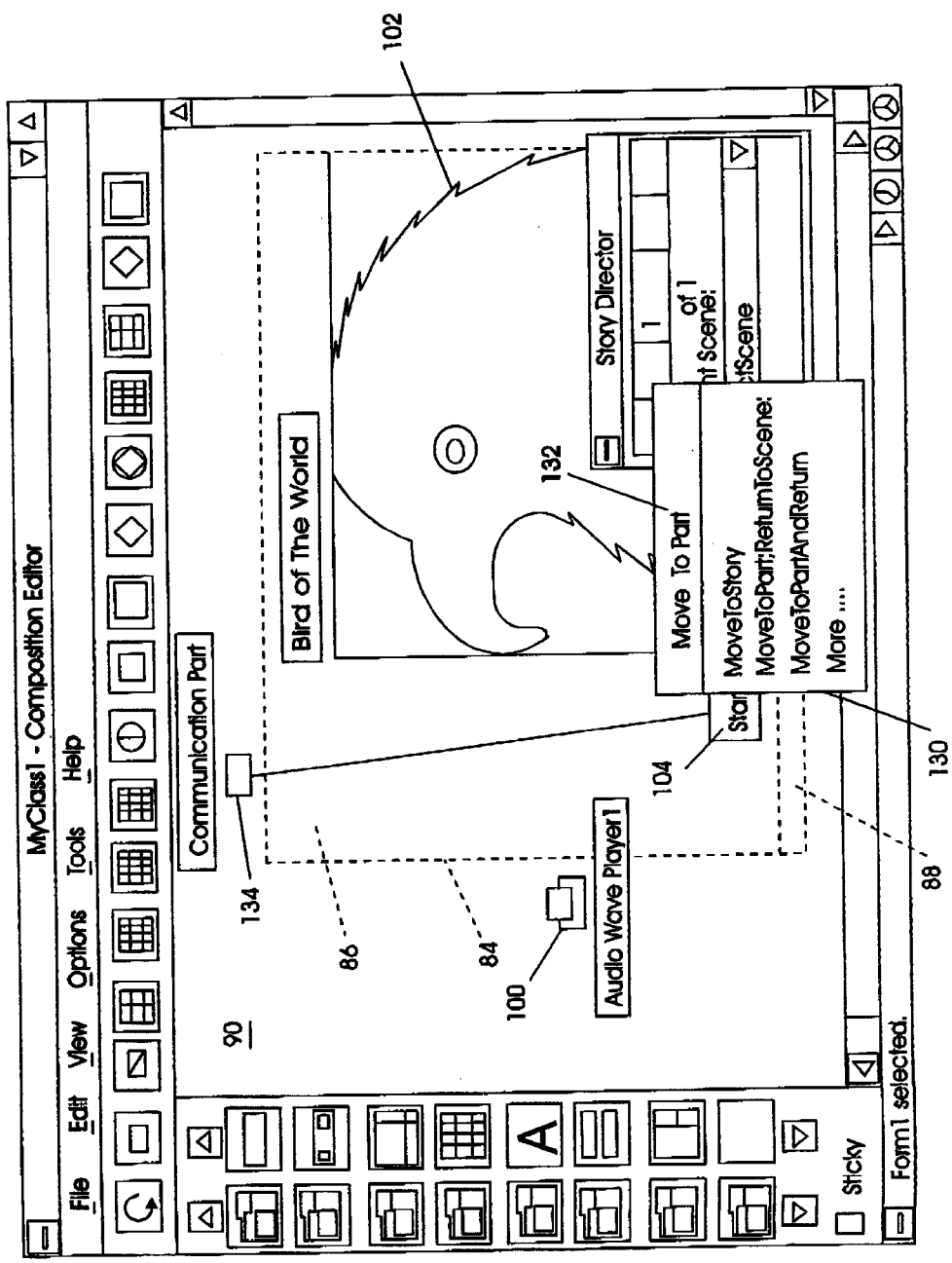
FIG. 10 illustrates the scene of FIG. 8 having an external navigation menu displayed.
Figure 11:
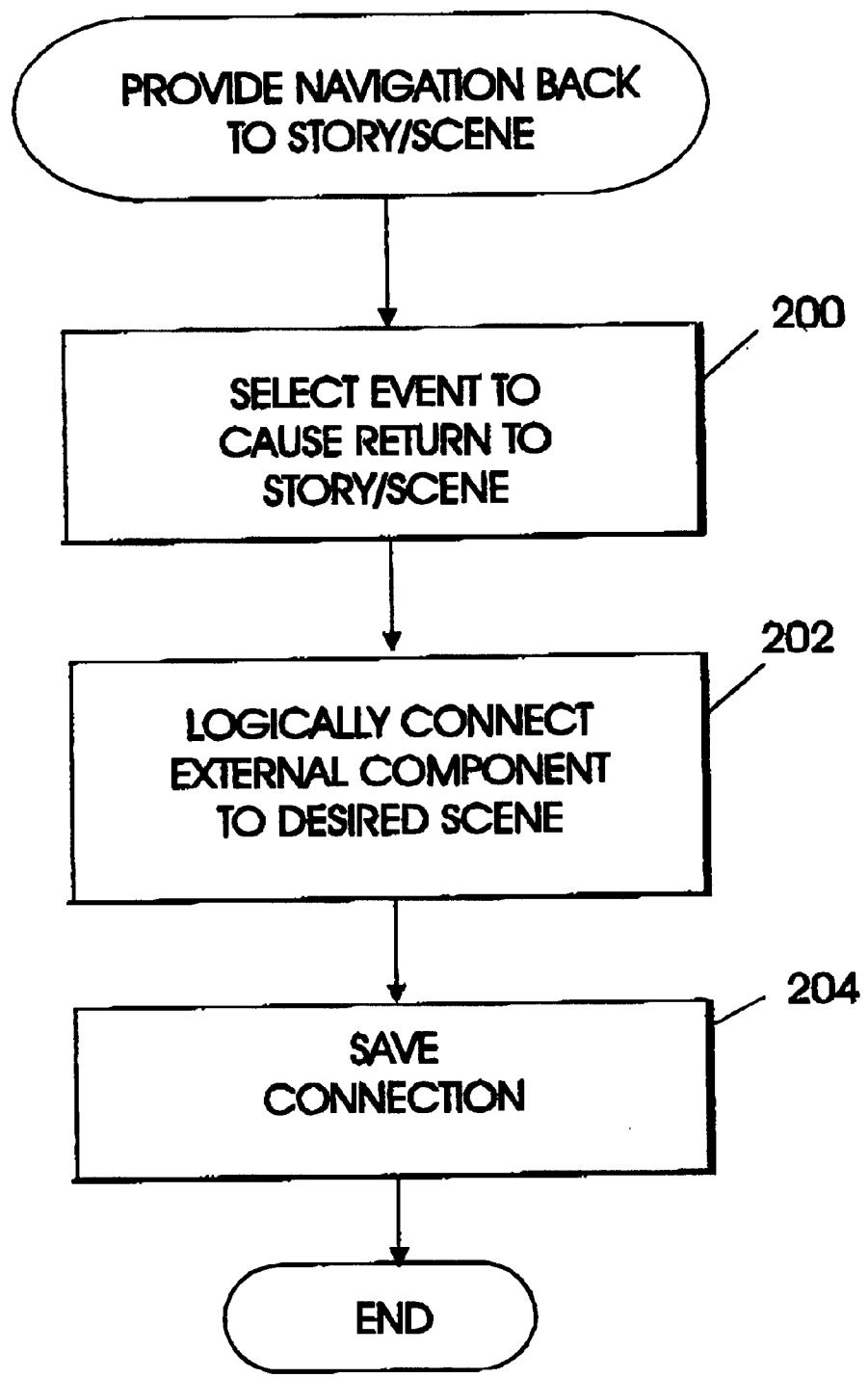
FIG. 11 is a flowchart illustrating the logical steps associated with developing navigation from a component external to the story to a scene within the story.

If the developer does not want to select a settings notebook for either the story or a scene as per Step 106, a number of other development options are available. For example, the developer may decide to add multimedia content to the scene displayed in the work area 90, such as an image, a photograph, a video clip, music (an audio clip), etc. (Step 126). Such content is typically contained in a resource file accessible by the application development tool. To enable a resource file such as a sound or video clip, the developer first selects an appropriate enabling part and adds that part to the scene (Step 128). Such enabling parts, such as an audio wave player for permitting the playing of an audio clip, are accessible via the parts palette 82 of the composition editor 80, in accordance with known techniques. As illustrated in FIG. 8, an audio wave player part 100 has been pulled from the parts palette 82 and an instance of the part has been added to the application being created. An audio resource file is then added to the application and connected with the audio wave player part to enable playing of the audio clip during execution. The audio file is also connected to a desired scene (Step 130), such that upon occurrence of an event (such as upon first displaying the scene or selection of a hot spot within the scene), the audio clip contained in the audio file will be played. The underlying technique for adding multimedia parts to a scene and connecting them to the scene and enabling them to cause an executable multimedia resource (such as an audio clip) to be performed during execution of a story upon occurrence of an event are well-known. The scene portion 86 of FIG. 8 also includes a bitmap 102 of a bird which has been added to the scene displayed in the scene portion 86, a well as a "start" button 104. The start button 104 may be logically connected to the audio wave player 100 such that selection of the start button 104 initiates playing of the music contained in the audio resource file.

The developer also has the option to add internal navigation to the scene displayed in the scene portion 86 (Step 132) by selecting an "internal navigation" option 106 from the menu 91 (FIG. 6), which causes an "internal navigation options" menu 110 (FIG. 9) associated with the scene portion 86 to be displayed (Step 136). The menu 110 provides internal navigation options for moving to other scenes within the story from the scene displayed in the scene portion 86. A navigation option may be associated with a specific event or action which can occur within the displayed scene 86, such as the selection of a hotspot by an end user (such as the start button 104 or a hot spot defined within the area of the bitmap 102), the passage of time, etc.

Associating a navigation option with an event or action may be accomplished in a number of ways, such as by selecting the internal navigation option when the mouse cursor is over a desired or specific hotspot within the displayed scene, or by physically connecting with lines the desired option within the internal navigation menu 110 with a specific event or item within the displayed scene to create a logical connection (Step 134). Physical connection between parts or components of an application under development is provided by the parts architecture and power tool development environment. By holding down a mouse button and moving the mouse so that the mouse cursor moves from the menu 110 to the desired hot spot, a line is drawn between these elements, creating a logical link between selection of the hot spot and the desired menu function. Code written into the code for the menu function causes the selected menu function to occur when the hot spot is selected. Navigation is associated with the selectable event from the scene 86 by selecting one of the options provided by the navigation menu 110 (Step 138). For example, a "move to next scene" option 112 may be selected, whereby occurance of the associated event causes the story to display the next numbered or sequential scene within the story. Selection of a "begin story" option 114 causes the story to begin again upon occurrence of the associated event. Similarly, a specific scene may be specified by the developer selecting the "moveToscene:" option 116 and providing the name for a specific scene to which the story is to jump upon occurance of the event. Similarly, the menu 110 may be used to specify the previous scene by selection of a "moveToPrevious Scene" option 118. Other navigation options may also be provided via the "More . . . " option 120 in the menu 110.

Another option available to the developer is the addition of external navigation to a scene. Relative to a displayed scene, such as the scene displayed in the scene portion 86, the developer may choose to cause the scene options menu 91 to be displayed and then select an "external navigation menu" option 108 by manipulating the mouse buttons (Step 140) to cause an "external navigation" menu 130 (FIG. 10) to be displayed within the work area 90. The external navigation menu 130 provides options available relative to connecting an element or component such as a hot spot in the scene with an element external to both the scene and the story. For example, a story may present information in its scenes regarding tours available through a travel agency. Or, a story may provide scenes which provide information regarding restaurants. A scene in the travel agency story may include a hot spot which is connected with a component within the overall application which includes logic which opens a telephone link via the Internet between the end user and a travel agent which permits direct voice communication. In a scene for a restaurant, selection of a hot spot can connect the application which includes the story to a database which includes the restaurant menu. The restaurant's menu for the day may then be presented to the end user via the display device.

Like the technique for creating connections for internal navigation, external connections are enabled by selecting a desired option within the menu 130 and then placing the mouse cursor over the desired connecting component or element within the scene displayed in the scene portion 86 (Step 142). By selecting the desired choice on the navigation menu 130, such as a "move to part" option 132, and then holding the left mouse button and physically connecting with a line the component or hot spot within the displayed scene to a graphical representation 134 of the element external from the story (but within the work area 90), a logical connection is made to the external element (Step 144). During execution of the application, when the connected element is selected within the scene or other connected event occurs, such as the passage of a predetermined period of time, processing jumps from the story to the external element. This external element may be any logic which may exist within the application, such as another story, logic for querying of a database to pull up and display the current menu for a restaurant, a part which enables voice and video communication to be started with a travel agent to discuss in detail a desired itenenary, etc.

As mentioned previously, the details of enabling parts within an application development environment and providing logical connections between parts are provided by creating the part in accordance with a parts architecture. Thus, the ability to connect or interconnect parts is enabled by writing the parts to the parts architecture.

The present invention also provides for connecting a component of an application which is external to the story to a scene within the store. Such a connection provides that upon occurrence of an event within the external component, such as selection of an element by an end user, processing jumps to the selected scene in the story, causing the selected scene to be displayed to the end user. Alternatively, the external component to which processing jumped from a scene within the story part may have incorporated therein a connection back to the scene (or any scene within the story) such that, for example, when voice communication has been completed between a travel agent and the end user, processing automatically returns to the scene in the story. The scene from which the application jumped is once again displayed to the end user. Or, when the end user has finished reviewing a restaurant menu, the end user may select a selectable element displayed to the end user such that the original scene or another scene within the story, such as the next scene, is displayed to the end user, replacing the menu in the display.

During processing of the external component, the developer selects the event or occurrence within the external component from which jumping is desired (Step 200). Next, the developer connects the external component with the desired target scene within the story part 84 (Step 202). This may be accomplished using the technique of physically connecting the external component and scene with lines, which is provided by the tool environment and parts architecture. Upon saving the connection (Step 204) the component and scene are logically connecting and navigation is enabled.

Figure 5A:
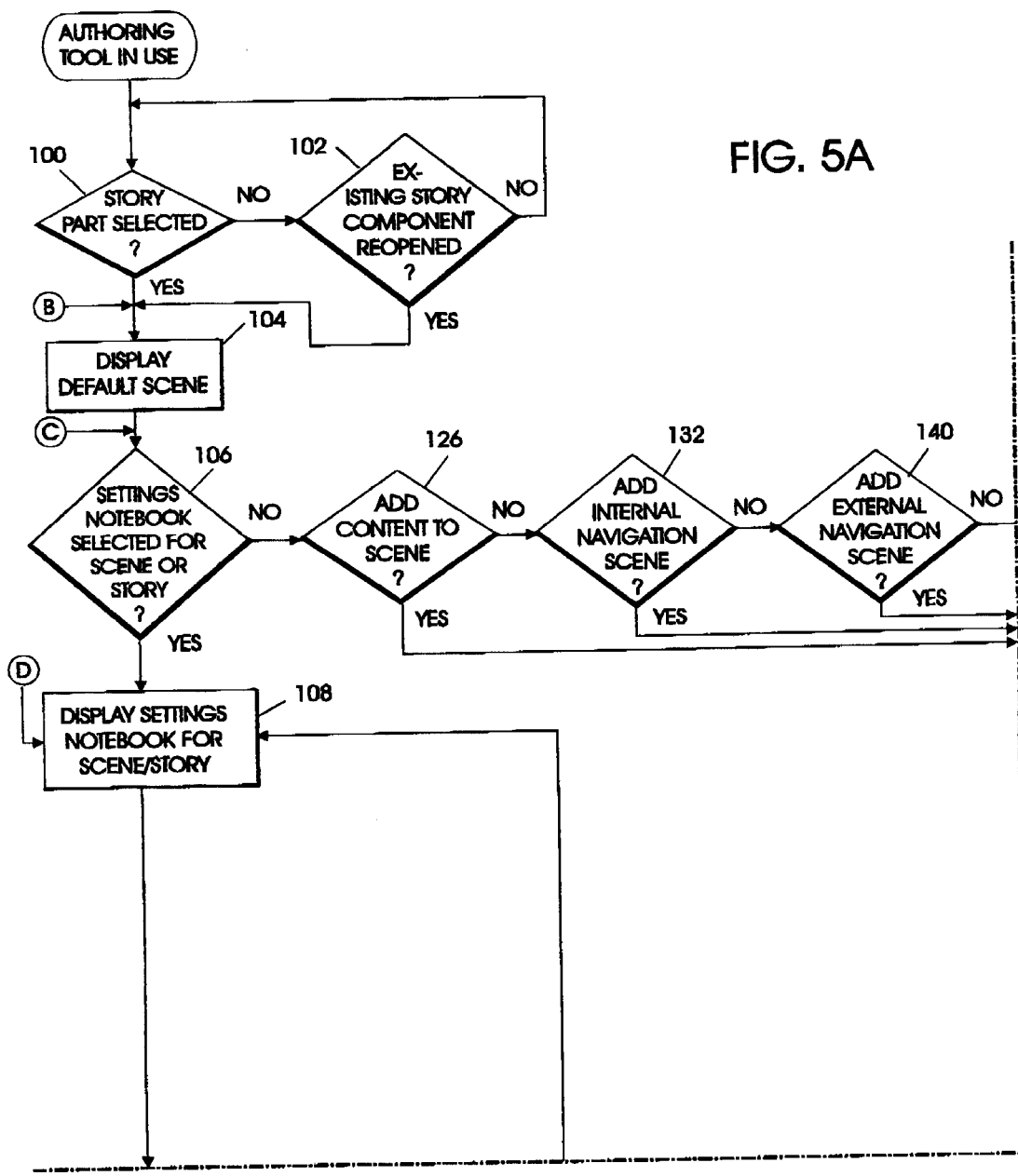
FIGS. 5A–5C show a flow chart illustrating the logical steps involved with creating a flipbook style multimedia title by utilizing the sequence editor part of the present invention.
Figure 5B:
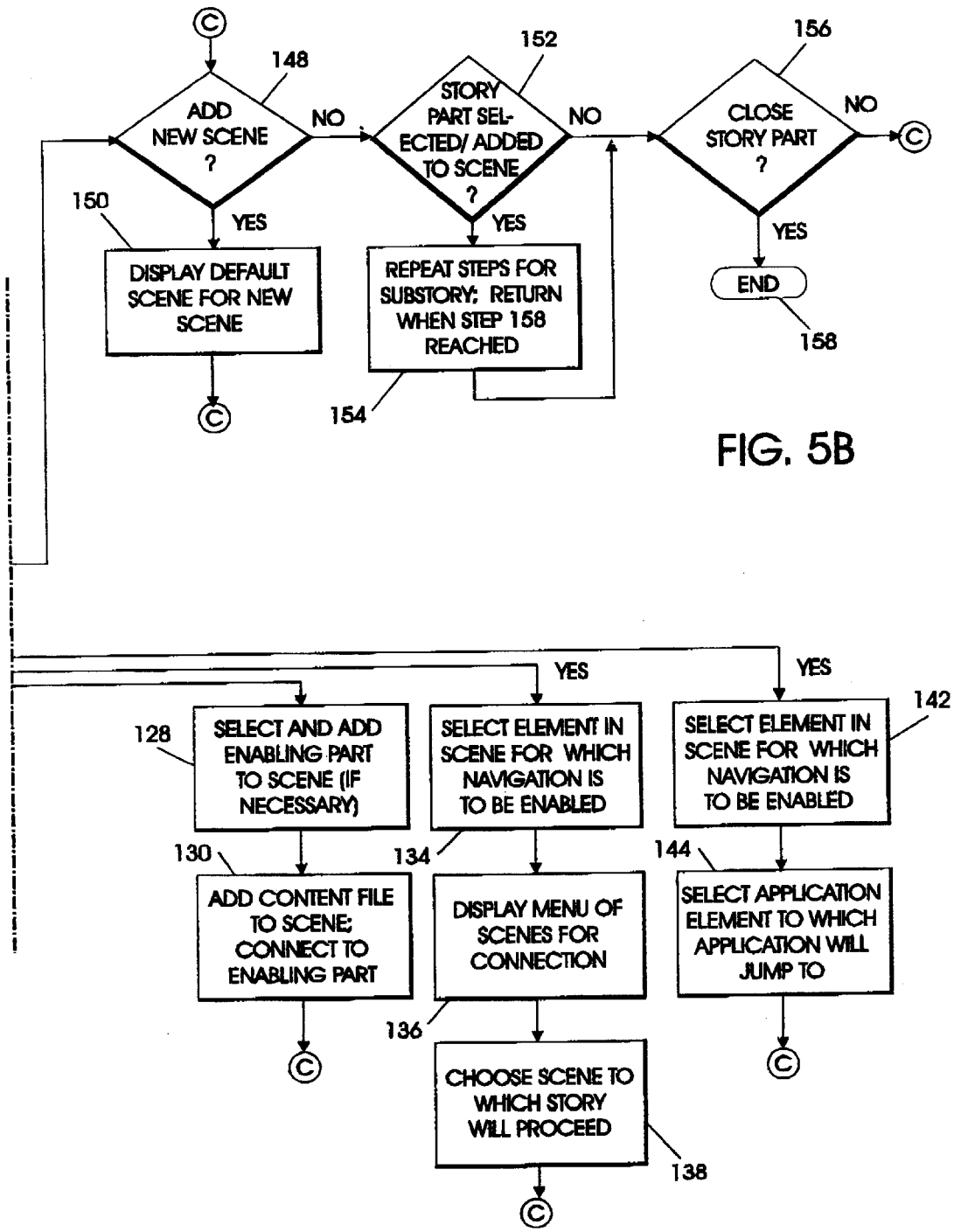
Figure 5C:
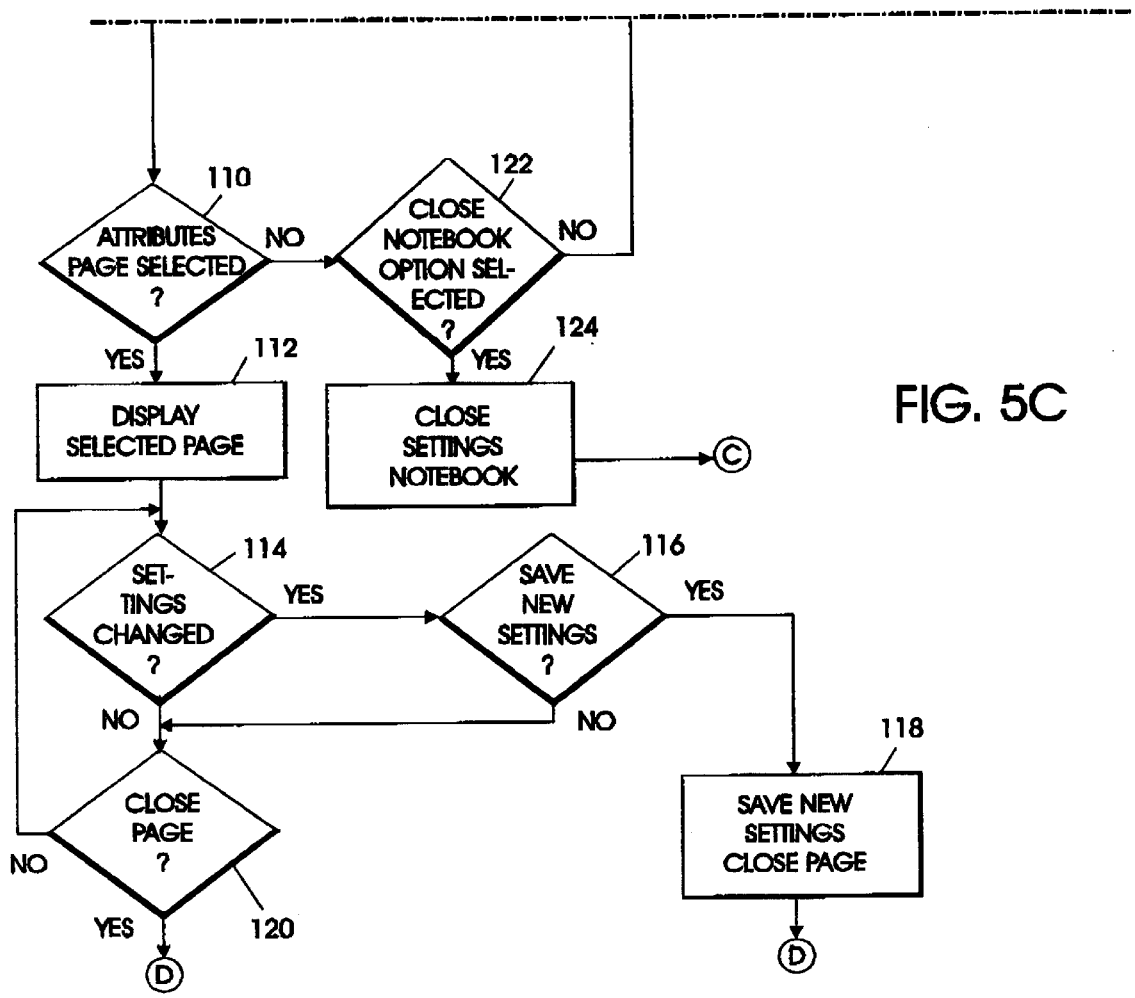
Figure 5:
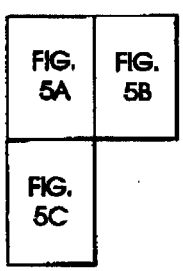

Additionally, another option available to a developer is to add a new scene (Step 148 of FIG. 5). Once again, by manipulating the mouse keys, the scene menu 91 is displayed, and the "more" option 122 is selected to show additional options, which include an option to add a new scene. By selecting the "add a new scene" option (Step 148), a new scene is displayed in place of the scene that had been displayed in the scene portion 86 (Step 150). Similarly to Step 106, an empty scene is preferably displayed as the new scene within the scene portion 86, and the developer is able to add content to or otherwise modify the new scene and connect the new scene with other scenes within the story or other elements in the application in the manner described above.

Another option available to the developer is to add an additional or new story within a scene. This is referred to as embedding a story within a scene. Embedding a story in a scene is accomplished by the developer selecting the story navigation part icon from the parts palette 82 and dragging it into the scene displayed within the work area 90 (Step 152). The developer may then create the embedded story in the same manner as its parent story has been created. This includes the processing described relative to Steps 104–158, including Steps 140–144, whereby the embedded story may be connected with other elements in the overall application being created.

Upon completion of the creation of the embedded story, processing returns to the parent story, and the developer has all of the processing options available relative to the parent story.

The developer may also use the main scene menu 91 or the main story menu to indicate that the developer has completed development of the story by selecting a "close" option (element 136 in the scene menu 91) (Step 156). The story is then saved and processing relative to the story is ended (Step 158). As discussed above, the developer may reopen the story to continue the development relative to the story at a later time.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. In a computing environment, a software component for creating a multimedia story having a plurality of individual scenes included therein, said software comprising:

first subprocesses for logically connecting a first scene in a multimedia story being created to a software element external to the multimedia story for causing processing to jump from the first scene to the external software element upon occurrence of an event relative to the first scene;

second subprocesses for automatically linking an event in a second scene to a third scene in the multimedia story such that occurrence of the event causes processing to jump from the second scene to the third scene during execution of the multimedia story; and third subprocesses for permitting a second story to be embedded within one of the scenes of the multimedia story.

2. In a computing environment, a software component for creating a multimedia story having a plurality of individual scenes included therein, said software component comprising:

first subprocesses for logically connecting a first scene in a multimedia story being created to a software element external to the multimedia story for causing processing to jump from the first scene to the external software element upon occurrence of an event relative to the first scene; and second subprocesses for automatically linking an event in a second scene to a third scene in the multimedia story such that occurrence of the event causes processing to jump from the second scene to the third scene during execution of the multimedia story, wherein the software component is an object oriented part.

3. In a computer environment, a system for permitting simplified navigation from scenes in a multimedia story which comprises a plurality of scenes, comprising:

means for associating an event within a first scene with a software component external to said multimedia story so that upon occurrence of said event during execution of the multimedia story, processing jumps from the first scene to the external software component;

means for automatically connecting a second event within a second scene to a third scene within the multimedia story so that upon occurrence of the second event associated with the second scene during execution of the multimedia story processing jumps to the third scene; and means for permitting a new multimedia story to be embedded within one of the scenes of said multimedia story.

4. In a computer environment, a system for permitting simplified navigation from scenes in a multimedia story which comprises a plurality of scenes, comprising:

means for associating an event within a first scene with a software component external to said multimedia story so that upon occurrence of said event during execution of the multimedia story, processing jumps from the first scene to the external software component; and means for automatically connecting a second event within a second scene to a third scene within the multimedia story so that upon occurrence of the second event associated with the second scene during execution of the multimedia story processing jumps to the third scene, wherein said multimedia story and the external software component are both parts which are included in an application created with a power tool.

5. A method implemented in a software development tool for creating a multimedia application comprising a plurality of individual scenes, said method comprising the steps of:

creating a plurality of individual scenes for a multimedia application under development;

automatically connecting a first scene in the multimedia application being created to a software element external to the multimedia application for causing processing to jump from the first scene to the external software element upon occurrence of a first event relative to the first scene during the execution of the multimedia application;

automatically linking a second scene to a third scene in the multimedia application for causing processing to jump from the second scene to the third scene upon occurrence of a second event while the second screen is displayed to a user during the execution of the multimedia application; and automatically embedding a second story within a fourth scene of the multimedia application and logically connecting the fourth scene to the embedded story for causing processing to jump from the fourth scene to the embedded story upon occurrence of a third event relative to the fourth scene.

6. A method according to claim 7, further comprising the step of:

causing processing to return to the fourth scene upon completion of the embedded story.

7. A method implemented in a software development tool for creating a multimedia application comprising a plurality of individual scenes, said method comprising the steps of:

creating a plurality of individual scenes for a multimedia application under development;

automatically connecting a first scene in the multimedia application being created to a software element external to the multimedia application for causing processing to jump from the first scene to the external software element upon occurrence of a first event relative to the first scene during the execution of the multimedia application; and automatically linking a second scene to a third scene in the multimedia application for causing processing to jump from the second scene to the third scene upon occurrence of a second event while the second screen is displayed to a user during the execution of the multimedia application, wherein said method is implemented in an object oriented part used by the software development tool.

* * * * *